UNITED STATES PATENT OFFICE.

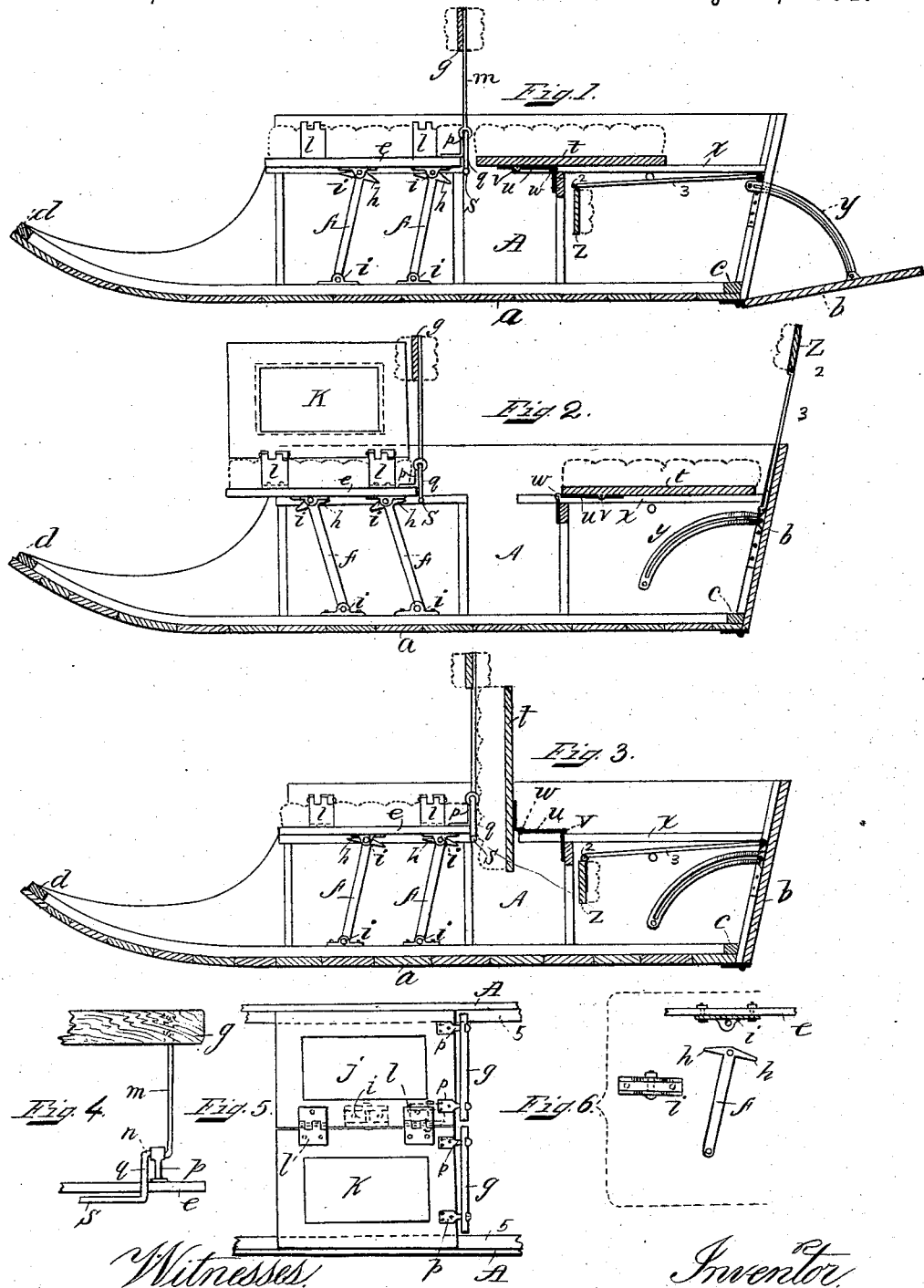

JOSEPH T. CLARKSON, OF AMESBURY, MASSACHUSETTS.

SHIFTING SEAT FOR CARRIAGES.

SPECIFICATION forming part of Letters Patent No. 455,738, dated July 14, 1891.

Application filed September 26, 1890. Serial No. 366,193. (No model.)

*To all whom it may concern:*

Be it known that I, JOSEPH T. CLARKSON, of Amesbury, in the county of Essex and State of Massachusetts, have invented a new and useful Improvement in Carriages, which will, in connection with the accompanying drawings, be hereinafter fully described, and specifically defined in the appended claims.

In said drawings, Figure 1 is a sectional elevation of a carriage body, seats, and coacting parts embodying my invention, the section being vertical and longitudinal through the floor and cross-sills, and the elevation showing the right-hand carriage body, side, and seats as viewed from the left-hand side, the seats being shown in position as when those occupying the rear seat face backward. Fig. 2 is a view similar to Fig. 1, but with the seats shown as arranged for the occupants of both to face to the front, one-half of the front seat being shown as turned up to allow access to the rear seat. Fig. 3 is a view similar to those preceding, but as with the rear seat adjusted to serve as part of the back of the front seat. Fig. 4 is a detached rear elevation showing the construction of the support of the lazy-back of the front seat and the manner of its support. Fig. 5 is a detached top plan view of the subdivided front seat. Fig. 6 shows detached views of my improved jumping-irons and their attachments.

This invention relates to what are known as "two-seated" carriages—that is, carriages having a front and rear seat; and it consists in certain means and the combinations thereof and therewith, whereby the front seat may be arranged in a forward or more rearward position, whereby the rear seat may be so arranged that the occupants thereof may, as preferred, face to the front or rear, also whereby access is had from the front of the carriage to the rear seat, and also whereby the front seat may be arranged as the sole seat, with the rear seat arranged as part of the back of the front seat.

It is premised that all that is shown in Figs. 1, 2, and 3, as pertaining to the right-hand side of the carriage-body is in the usual manner duplicated at the left-hand side, with the exception of the jumping-irons of the front seat, as will be explained.

Referring again to said drawings, A represents the side of the body.

$e$ is the front seat, supported upon jumping-irons $f\,f$, these irons being formed with an elongated head consisting of the lateral arms $h\,h$, the upper face or line of which have such respective obliquity to the axis of the vertical part as that when the seat is jumped into position either forward or to the rear the arms $h$ will hold the seat from further movement. Said irons $f$ are pivoted in ear-flats $i$, respectively secured to the seat and body, as shown. Said seat is tranversely divided into parts $j\,k$, united by hinges $l$, parts $j$ being provided with four jumping-irons. Part $k$ at its outer or free end may rest on a ledge 5, secured to side A, as shown in Fig. 5, and the outer end of part $j$ may, when jumped, rest upon a similar ledge, if preferred.

The back $g$ of seat $e$ is supported by standards $m$, which have an inturned angle $n$, that constitutes a pivotal bearing in the eye-like head of standard $p$, secured to the seat, said standard descending, as at $q$, below the seat, where it may either terminate, or it may extend to the opposite end of the seat and connect integrally with the corresponding standard at that side.

The rear seat $t$, which rests upon ledge $x$, is pivotally attached to the body by link $u$, one end of which is pivotally attached to the seat at $w$, and the other to the body at $v$. Hence the rear seat has an adjustment fore and aft equal to twice the length of said link, and may be moved forward, as in Fig. 1, when its occupants desire to face to the rear, (and away from the old folks on the front seat,) or it may be adjusted to a rearward position, as in Fig. 2, when the occupants desire to face in the direction in which they are moving. A back $z$ for said rear seat is hinged at 2 to standard 3, which latter is hinged by a rule-joint at 4 to an iron secured to the body. Said standard and back are so proportioned that when rear seat $t$ is in its forward position, as in Fig. 1, or when it is turned up to serve as part of the back of the front seat, as in Fig. 3, the back $z$ and its supporting-standard may be folded down within the body, as shown. When the rear seat is jumped forward, the tail-board $b$ is opened to serve as a foot-board, as shown in Fig. 1. When part k of the front seat is to be turned up, as in Fig. 2, its back g is first turned down to allow the movement.

I claim as my invention—

1. The seat-back supports m, formed with the lateral angle n, journaled in standards p, and with the downward extension q to bear against the rear edge of the seat, substantially as specified.

2. In combination with the reversible rear seat of a two-seated carriage, the jointed back z, secured to the body and adapted to be arranged below the rear seat, substantially as specified.

3. In a two-seated carriage, the combination, with the front seat, of the rear seat having a double-jointed connection with the body, as by link u, whereby said seat may be moved to a front or rear position or turned up to serve as a back to the front seat, substantially as specified.

4. In combination with a rear seat, a front jump-seat divided transversely and with its halves or sections hinged together to allow the turning up of one-half to form a passage to the rear seat.

5. The combination of a front jump-seat provided with a back, a rear jump-seat arranged to be upturned and provided with a turn-down back, and a hinged tail-board arranged to serve as the foot-board of said rear seat when the occupants thereof face to the rear, substantially as specified.

6. A carriage-seat divided transversely (in the longitudinal line of the carriage) and with the halves thereof hinged together and provided with a set of jumping-irons applied to one of said halves, whereby the entire seat may be jumped upon said irons or one-half may be turned up to allow a passage by the same, substantially as specified.

JOSEPH T. CLARKSON.

Witnesses:
GEORGE H. BRIGGS,
WM. T. CLARKSON.